(12) United States Patent
Stewart et al.

(10) Patent No.: US 8,969,472 B2
(45) Date of Patent: Mar. 3, 2015

(54) USE OF ANTISTATIC ADDITIVES IN SANDABLE REPAIR PRODUCTS FOR AIRBORNE DUST REDUCTION

(71) Applicant: DAP Products Inc., Baltimore, MD (US)

(72) Inventors: Dianne Alexandra Stewart, Columbia, MD (US); John Scott Nevin, Idlewylde, MD (US); Paul Michael Kurtz, White Hall, MD (US)

(73) Assignee: DAP Products Inc., Baltimore, MD (US)

( * ) Notice: Subject to any disclaimer, the term of this patent is extended or adjusted under 35 U.S.C. 154(b) by 0 days.

(21) Appl. No.: 13/828,328

(22) Filed: Mar. 14, 2013

(65) Prior Publication Data

US 2014/0275369 A1    Sep. 18, 2014

(51) Int. Cl.
| | | |
|---|---|---|
| *C08G 18/63* | (2006.01) | |
| *C08F 292/00* | (2006.01) | |
| *C09K 3/00* | (2006.01) | |
| *C09D 5/34* | (2006.01) | |
| *C09K 3/10* | (2006.01) | |

(52) U.S. Cl.
CPC ............... *C09D 5/34* (2013.01); *C09K 3/1025* (2013.01)
USPC .......................... 524/700; 524/701; 524/796

(58) Field of Classification Search
USPC ........................................ 524/700, 701, 796
See application file for complete search history.

(56) References Cited

U.S. PATENT DOCUMENTS

| | | | |
|---|---|---|---|
| 3,404,108 A * | 10/1968 | Regenstein, Jr. et al. ..... | 524/423 |
| 4,645,696 A | 2/1987 | Rood | |
| 5,648,116 A | 7/1997 | Roe et al. | |
| 5,989,696 A | 11/1999 | McCarthy et al. | |
| 6,358,309 B1 | 3/2002 | Langford | |
| 6,562,428 B1 | 5/2003 | Ohrui | |
| 6,673,144 B2 | 1/2004 | Immordino, Jr. et al. | |
| 6,676,746 B2 | 1/2004 | Langford | |
| 6,733,581 B2 | 5/2004 | Langford | |
| 6,863,723 B2 | 3/2005 | Langford | |
| 7,045,008 B2 | 5/2006 | Langford | |
| 7,048,791 B2 | 5/2006 | Langford | |
| 7,052,544 B2 | 5/2006 | Langford | |
| 7,407,996 B2 | 8/2008 | Langford | |
| 7,449,060 B2 | 11/2008 | Langford | |
| 8,262,793 B2 | 9/2012 | Stohr et al. | |
| 8,329,785 B2 | 12/2012 | Langford | |
| 2003/0113566 A1 * | 6/2003 | Clemens et al. ............. | 428/497 |
| 2007/0246683 A1 | 10/2007 | Miller et al. | |
| 2011/0009586 A1 | 1/2011 | Matsuda et al. | |
| 2011/0065839 A1 | 3/2011 | Ayambem et al. | |
| 2012/0017808 A1 | 1/2012 | Sealey et al. | |
| 2012/0077886 A1 | 3/2012 | Scholz et al. | |
| 2012/0216944 A1 | 8/2012 | Langford | |

FOREIGN PATENT DOCUMENTS

| | | |
|---|---|---|
| JP | 2007145992 A | 6/2007 |
| KR | 20040014798 A | 2/2004 |

OTHER PUBLICATIONS

U.S. Patent and Trademark Office, International Search Report and Written Opinion issued in corresponding Internatonal Patent Application No. PCT/US2014/018214 (May 20, 2014) (13 pages).

* cited by examiner

*Primary Examiner* — William Cheung
(74) *Attorney, Agent, or Firm* — Wood, Herron & Evans, LLP

(57) ABSTRACT

The present invention is directed to ready to use (wet) and setting (dry) repair products with antistatic additives having reduced persistent airborne dust particulates upon sanding thereof. Such wet and dry repair products include, in part, an antistatic additive(s) that can reduce or eliminate the static charge that forms in dust particulates when dried repair products, such as spackling compounds, cementitious materials, and joint compounds, are sanded, for example. In turn, this can help reduce the quantity of airborne dust particulates, the time in which they are suspended, and the distance they travel in a given room or job site. In one example, a repair product for use as a dry repair compound can include an anti-static additive, which can include a cationic charge, and optionally a metal complex. In another example, the repair product further includes water to define a wet or ready to use repair product.

28 Claims, No Drawings

USE OF ANTISTATIC ADDITIVES IN SANDABLE REPAIR PRODUCTS FOR AIRBORNE DUST REDUCTION

TECHNICAL FIELD

The present invention relates generally to the use of antistatic additives in sandable repair products and, more specifically, to ready to use (wet) and setting (dry) repair products with antistatic additives having reduced persistent airborne dust particulates upon sanding thereof, for example.

BACKGROUND

With respect to the creation of airborne dust, static charged dust particulates can be formed during sanding of a dried repair product, e.g., a dried spackling compound, cementitious material, or joint compound. Once dust is generated, it can be carried through the air. These airborne dust particulates can be circulated by air currents, which contain large (e.g., greater than 10 microns) and small (e.g., less than 10 microns) dust particulates. As the particulates move and tumble through the air (Brownian motion), a surface charge can build on the dust particulates. When the charged airborne particulates are in close proximity, depending upon their carried charge, they can attract or repel one another (Coulomb's Law). As time goes by, oppositely-charged dust particulates can aggregate and collectively increase in size and weight. The heavier airborne dust particulates, such as those greater than 10 microns, settle out of the air first with the smaller airborne dust particulates, such as those less than 10 microns, remaining persistently airborne for longer periods of time.

Construction or job sites can use many different types of construction materials, such as cinder blocks, concrete, metal, wood, glass, drywall, stucco, etc. Airborne dust can be easily created at these job sites from workers by abrading, sanding, grinding, or sawing these construction materials. Other materials at job sites, such as repair products, e.g., spackling compounds, cementitious materials, and joint compounds, can also create significant airborne dust upon sanding thereof, such as to remove surface imperfections, for example. The airborne dust at a construction or job site can pose as a nuisance. Dust particulates within any given job site can remain airborne for long periods of time and travel relatively significant distances. Time consuming and costly hours can be spent cleaning and maintaining a job site. Airborne dust particulates, particularly persistent airborne dust particulates, can be a nuisance on the jobsite for health reasons as well. Reports from the National Institute for Occupational Safety and Health (NIOSH) have noted the potential health concerns. To reduce, for example, the hazards associated with sanding sandable products, recommendations from NIOSH have included the use of exhaust ventilation, wet sanding, and personal protective equipment.

Accordingly, there is a need for improved repair products that can minimize the amount of persistent airborne dust when these repair products are sanded, for example, thereby reducing health concerns and cleanup time.

SUMMARY

The present invention relates to ready to use (wet) and setting (dry) repair products having reduced persistent airborne dust particulates such as upon sanding thereof. Such wet and dry repair products include, in part, an antistatic additive(s) that controls and reduces or eliminates the static charge that forms in dust particulates when dried repair products, such as spackling compounds, cementitious materials, and joint compounds, are sanded, for example. More specifically, dust can be controlled at the abrading interface of a sanded repair product through the use of the antistatic additives. The antistatic additives control static charge generation and the material conglomerates before the dust becomes airborne. In turn, this reduces and controls the quantity of airborne dust particulates and the time in which they remain suspended.

The base principles of static charge are explained in Coulomb's law. In Coulomb's law, the three most important variables are charge (+), charge (−) and distance. There are always two charges and a distance between particles that influence the strength of the interactions between them. Like charges repel one another, opposite charges attract and influence the distance between objects. The closer the objects are to one another, the greater the interaction. Static charge is generated when the material is sanded, for example, which is an effect similar to rubbing a balloon on one's arm or head and placing it on the ceiling. Antistatic additives control and reduce the charge build up and allow the sanded particulate to conglomerate at the sanding interface rather than allowing the particulate to become airborne.

Air is a fluid and when a repair product is abraded, the abraded material becomes airborne in the form of dust or particulates. The random motion of suspended particles in a fluid (liquid or gas) that results from bombardment between fast moving particles is known as Brownian Motion. The interaction of random collisions suspends small (e.g., 10 microns or less) airborne particulate for long periods of time especially if the material contains ionized or static charged particles. The particles are more likely to stay airborne if they are charged. An antistatic additive(s) controls, reduces, or eliminates the static charge that forms in dust particulate when dried repair products, such as spackling compounds, cementitious materials, and joint compounds, are sanded, for example.

In accordance with an embodiment of the invention, a repair product, such as a dry (setting) powder repair product, includes an anti-static additive having a cationic charge. The repair product can further include water and define a wet or ready to use repair product. In one example, the repair product can also include a metal complex. With respect to the metal complexes, calcium carbonate, barium sulfate, and other heavier metal complexes, for example, can produce a negative charge when sanded. The antistatic additives, some of which may produce positive charges when sanded, counteract the negative charge so that the resulting dust is neutralized. Desirably, the dust conglomerates and falls to the floor instead of becoming airborne.

In another embodiment, a repair product, such as a wet or dry powder repair product, includes an anti-static additive selected from a quaternary ammonium compound, an amine compound, an amide, a phosphate, a sulfur compound, a boron containing compound, an aluminum oxide, a metal salt, an ethylene acetate copolymer, a phosphate ester, glyceryl monostearate, mono or diglycerides, or combinations thereof. In one example, the repair product can further include a metal complex.

In yet another embodiment, a repair product, such as a wet or dry powder repair product, includes an anti-static additive that is a secondary alkane sulfonate alkali metal salt or a long chain alkyl bis(2-hydroxyalkyl)amine. The repair product further includes a binder and/or filler and a metal complex selected from a metal oxide, metal hydroxide, metal carbonate, or metal sulfate and wherein the metal is an alkaline earth metal. In one example, the antistatic additive can be present in an amount from 0.05% to 5% by wt of the wet repair product and the metal complex can be present in an amount of from 0.1% to 90% by wt of the wet repair product.

In still another embodiment, a method of using the repair products above includes applying the repair product, in a wet form, to a surface in need of repairing, patching, and/or renewing, wherein the static charge of airborne dust particulates is reduced or controlled when the wet repair product is dried and sanded upon the surface.

In yet another embodiment, a method for reducing or controlling the static charge of airborne dust particulates includes providing the repair products above with their antistatic additive(s), the repair product adapted to be applied to a surface in need of repairing, patching, and/or renewing, wherein the static charge of airborne dust particulates is reduced or controlled when the wet repair product is dried and sanded upon the surface.

By virtue of the foregoing, there are provided improved repair products and methods of use thereof that can reduce the amount of persistent airborne dust when the repair product is sanded, for example, thereby minimizing potential health concerns and reducing cleanup time.

DETAILED DESCRIPTION OF SPECIFIC EMBODIMENTS

The present invention is directed to wet and dry repair products having reduced persistent airborne dust particulates such as upon sanding thereof, and methods of use thereof. To that end, the present invention helps control airborne dust of sandable products, which is a perceived need in the construction industry as well as for homeowners and DIY'ers (do-it-yourselfers).

For purposes herein, a repair product includes those products or materials used to repair, patch, and/or renew a surface that may require sanding, as well as abrading, sawing, grinding, and the like, for example, to remove imperfections to its surface. Such surfaces can be cementitious, gypsum, plaster, stucco, concrete, wood, masonry, and the like. And such sandable repair products include, but are not limited to, joint compounds, spackling compounds, cementitious materials (including concrete mixes), stucco materials, and the like.

Also, with respect to the wet and dry repair products in accordance with embodiments of the present invention, as understood in the art, a dry (setting) repair product is one that is generally provided, such as to a consumer, in powder form. Prior to use, a liquid, typically water, must be mixed by the consumer with the dry (setting) or powder repair product in a desired ratio so as to provide a wet or ready to use repair product. Conversely, a wet (ready to use) repair product is one that has already been mixed with a liquid, typically water, and is provided to the consumer in a ready to use form. In other words, the wet repair product defines a repair product that is ready to use as is. With either dry setting or wet (ready to use) repair products, after application and upon drying, the repair products may be sanded, as desired, such as to remove surface imperfections and optionally painted, for example. Suitable water to powder ratios for producing a wet or ready to use repair product are 1:1 to 1:4. In another example, a suitable ratio is 1:3 (water to powder). Unless otherwise specifically stated herein, all percent by weights of the components for the repair products are for wet or ready to use repair products, i.e., after the addition of water, for example.

The wet and dry repair products of the present invention, which are suitable for use as joint compounds, spackling compounds, cementitious materials, and the like, include at least one antistatic additive, which reduces or controls the static charge of the airborne dust particulates generated, for example, by sanding repair products used to repair, patch, and/or renew a surface. In particular, the antistatic additive helps control the static charge on the airborne dust so that interaction between airborne dust particulates can be diminished, which reduces the amount of time the airborne dust particulates are suspended as well as the distance traveled by those particulates.

The antistatic additive can include powders or liquids. The antistatic additive can also include a positive (cationic) charge, be cationic in nature, or have the ability to form a positive charge. In one example, the antistatic additive can be, for example, a quaternary ammonium compound, an amine compound, an amide, a phosphate, sulfur compounds, boron containing compounds, aluminum oxides, and the like. Other antistatic additives can include metal salts, ethylene acetate copolymers, phosphate esters, glyceryl monostearate, mono and diglyceride mixtures, and the like.

Examples of suitable quaternary ammonium compounds include ethyl sulfate based quaternary ammonium compounds, such as Klearfac® AA 270, which is available from BASF of North America.

The amine compounds can include secondary amine compounds such as bis-amine compounds. Example of suitable bis-amine compounds include, for example, saturated or unsaturated long chain alkyl bis(2-hydroxyalkyl)amines. In one example, the long chain alkyl, independently, can include 8 to 22 carbon atoms. In another example, the long chain alkyl can include 10 to 20 carbon atoms. In another example, the long chain alkyl can include 18 carbon atoms. In one example, the alkyl of the hydroxyalkyl can include 1 to 6 carbon atoms. Specific examples of the bis amine compounds include octadecyl bis(2-hydroxyethyl)amine, coco bis(2-hydroxyethyl)amine, tallow bis(2-hydroxyethyl)amine, alkyl (C14-C18) bis(2-hydroxyethyl)amine, and oleyl bis(2-hydroxyethyl)amine.

A suitable octadecyl bis(2-hydroxyethyl)amine is Armostat® 1800 available from AkzoNobel of Chicago, Ill. A suitable coco bis(2-hydroxyethyl) amine is Armostat® 400 available from AkzoNobel. A suitable tallow bis(2-hydroxyethyl)amine is Armostat® 300 available from AkzoNobel. A suitable alkyl(C14-C18) bis(2-hydroxyethyl)amine is Armostat® 600 available from AkzoNobel. A suitable oleyl bis(2-hydroxyethyl)amine is Armostat® 700 available from AkzoNobel.

Examples of suitable amides include long chain carboxylic acid amides, such as erucamide. Other examples include bis-amides, such as bis(2-hydroxyalkyl)amides, e.g., N—N-bis (2-hydroxyethyl) dodecanamide, which is a lauric diethanol amide. In one example, the alkyl of the hydroxyalkyl can include 1 to 6 carbon atoms. A suitable erucamide is Nourymix® SP E60 available from AkzoNobel. A suitable N—N-bis(2-hydroxyethyl) dodecanamide is Armostat® 2002 available from AkzoNobel.

Examples of suitable metal salts include alkali metal salts, such as sodium or potassium salts. In one example, the alkali metal salt includes ethylene copolymers with alkali metal salts, such as potassium salts. In another example, the alkali metal salt can include secondary alkane sulfonate alkali metal salts, such as sodium sec-alkanesulfonate, where the sec-alkane can define, for example, a C10-C18, C13-C18, C14-C18, C13-C17, or C14-C17 sec-alkane, and the like. A suitable sodium sec-alkanesulfonate is Armostat® 3002 available from AkzoNobel.

Examples of suitable phosphate esters include phosphate esters of a polyoxyalkylated fatty alcohol, such as Klearfac® AA 270, which is available from BASF of North America. A suitable glycerol monostearate is Armostat® 1000 available from AkzoNobel. A suitable mono and diglyceride mixture of fatty acids is Armostat® 1000-LV available from AkzoNobel.

Also contemplated for use as antistatic additives are lubricants with antistatic additives, such as Mazon® JMR, which is a nonionic lubricant with cationic antistatic additives available from BASF of North America.

Amounts for the antistatic additive can range from 0.05% to 35% by weight of the repair product. In one example, the amount is from about 0.1% to about 10% by weight. In still another example, the amount is from about 1% to about 10% by weight. In still another example, the amount is from about 0.05% to about 5% by weight.

The repair products also can include one or more metal complexes, such as metal oxides, metal hydroxides, metal carbonates, metal sulfates, and the like. In one example, the metal is selected from an alkaline earth metal. Suitable examples of the metal complex include, but are not limited to, calcium carbonate, calcium oxide, calcium hydroxide, calcium sulfate (including the hemihydrate or dihydrate), barium sulfate, strontium sulfate, and the like. In one example, the metal complex is barium sulfate or strontium sulfate. The use of metal complexes in the repair product is understood to increase the density of the repair product, which helps to reduce the amount of airborne dust particulates formed while sanding.

Amounts for the metal complexes can include from about 0.1% to about 95% by weight of the repair product. In one example, the amount is from about 1% to about 90% by weight. In still one example, the amount is from about 1% to about 20% by weight. In yet another example, the amount is from about 10% to about 65% by weight.

Other optional components for use in the repair products of the present invention include one or more binders, such as a resin or polymer. Suitable examples of the binder include, but are not limited to, polyurethanes, vinyl esters, vinyl or polyvinyl acetate, polyvinyl alcohol, vinyl acrylic, polyvinyl acrylic, styrene acrylic or butadiene, polycarbonates, natural or synthetic latexes, sugars, and starches. The binder can take the form of a dispersion, emulsion, or powder. The binder can be present in an amount from about 1% to about 85% by weight. In one example, the amount is from about 10% to about 85% by weight. In another example, the amount is from about 1% to about 20% by weight.

The repair products can also include one or more rheology modifiers including, but not limited to, thickeners such as Paragum™, which is a polyacrylic acid emulsion available from Para-Chem Southern of Mansfield, Tex., and Acrysol™, which is an alkali swellable acrylic polymer available from Dow Chemical of Philadelphia, Pa. Other suitable thickeners include hydroxyethyl or hydroxymethyl cellulose, including alkyl (e.g., ethyl)hydroxyethyl or hydroxymethyl cellulose, clays, and starches. Rheology modifiers also can include surfactants, thickeners, dispersing aids, and/or plasticizers, which can control the stability or spreading of the repair product when a force is applied thereto. Rheology modifiers may be present in the repair product in an amount from about 0.1% to about 10% by weight. In one example, the rheology modifiers may be present in an amount from about 1% to about 5% by weight.

The repair products may further include inert fillers such as calcium carbonate, concrete mixes, Portland cement, sand, glass beads, mica, talc, silica, aluminates, aluminum silicates, and the like. The inert fillers may be present in the repair product in an amount from about 18% to about 96% by weight. In one example, the amount is from about 25% to about 85% by weight.

Additional components for the repair products can include, but are not limited to, surfactants, fungicides, biocides (e.g., 4,4 Dimethyl Oxazolidine), ethylene or propylene glycol/antifreeze, wetting agents, plasticizers, base neutralizing agents (e.g., 2-amino-2-methyl-1-propanol), retarders (e.g., sodium citrate), and the like. These additional components can range from about 0.1% to about 33% by weight of the repair product.

It should be understood that the above components may themselves be provided in either a powder or liquid form for incorporation into the repair product. Also, standard mixing techniques, as known in the art, are utilized to prepare or mix the repair products.

In accordance with an embodiment of the invention, a dry (setting) repair product for use as a sandable repair product, such as a spackling compound, having reduced persistent airborne dust particulates upon sanding thereof includes at least the following:

Antistatic additive, about 0.05% to about 35% by weight;
Calcium sulfate, hemihydrate, about 30% to about 90% by weight; and
Calcium carbonate, 0% to about 60% by weight.

The above percent by weights for each component are based on the dry repair product, i.e., before the addition of water for example. The dry repair product can be mixed with water in a desirable ratio such as a 1:3 (water to powder) ratio so that it is ready to use. After application and drying thereof, the repair product can be smoothed by sanding and provides reduced airborne dust particulates.

In yet another embodiment, a dry repair product for use as a sandable repair product, such as a cementitious compound, includes at least the following:

Antistatic additive, about 0.05% to about 35% by weight;
Portland cement, about 30% to about 90% by weight;
Calcium carbonate, 0% to about 60% by weight;
Sand, 0% to about 75% by weight;
Aluminates, 0% to about 15% by weight; and
Aluminum oxide, 0% to about 10% by weight.

The above percent by weights for each component are based on the dry repair product, i.e., before the addition of water, for example. The dry cementitious repair product can be mixed with water in a desirable ratio, as is known in the art, so that it is ready to use. After application and drying thereof, the repair product can be smoothed by sanding and provides reduced airborne dust particulates.

In another embodiment, a wet repair product for use as a sandable repair product, such as a joint or spackling compound, having reduced persistent airborne dust particulates upon sanding thereof includes at least the following:

Antistatic additive(s), about 0.1% to about 35% by weight;
Metal complex(es), about 0.1% to about 95% by weight;
Binder(s), about 1% to about 85% by weight;
Optionally, rheology modifier(s); and
Water, % by weight remainder.

After application and drying thereof, the sandable repair product can be smoothed by sanding and provides reduced airborne dust particulates.

In another embodiment, a wet repair product for use as a sandable repair product, such as a joint compound or spackling compound, includes at least the following:

Antistatic additive(s), about 0.1% to about 35% by weight;
Metal complex(es), about 10% to about 85% by weight;
Binder(s), about 1% to about 50% by weight;
Rheology modifier(s), 0% to about 10% by weight;
Biocide(s) and/or fungicide(s), 0% to about 10% by weight;
Antifreeze, 0% to about 10% by weight;

Base neutralizing agent(s), 0% to about 10% by weight; and

Water, % by weight remainder.

In one example, the metal complex can include calcium carbonate. In another example, the rheology modifiers can include surfactants, thickeners, and/or dispersing aids. In another example, the binder can include water, polyurethanes, vinyl acetate, vinyl acrylic, styrene acrylic or butadiene, polycarbonates, natural or synthetic latexes, sugars, and/or starches.

In the above embodiments, the antistatic additive, in one example, can include a bis amine, such as coco bis(2-hydroxyethyl)amine, a sodium salt of an alkanesulfonate, such as sodium sec-(alkanesulfonate), and/or a quaternary ammonium compound, for example.

Non-limiting examples of specific repair products for use and testing as sandable repair products in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

EXAMPLE 1

A dry repair product, such as for use as a joint compound or spackling compound for patching surfaces, as prepared by mixing together the following components:

Calcium sulfate (e.g., White Moulding Plaster available from USG Corporation of Chicago, Ill.), 45%, Calcium carbonate (e.g., GSP-30 available from Imerys Pigments & Additives Group of Roswell, Ga.), 44.9%, Mica, powdered (e.g., Micawhite 200 available from Kings Mountain Mining LLC of Kings Mountain, N.C.), 8%, Sodium sec-alkanesulfonate (e.g., Armostat 3002), 1%

Vinyl ester polymer (e.g., Vinnapas RP 245 available from Wacker Chemical Corporation of Adman, Mich.), 0.7%, Ethyl hydroxyethyl cellulose (e.g., Bermocoll E-481 FQ available from Azko Nobel Cellulosic Specialties of Dobbs Ferry, N.Y.), 0.3%, Sodium citrate (available from Ashland Chemical Company of Columbus, Ohio), 0.05%.

The above dry repair product sample was tested against a control, which excluded the antistatic additive sodium sec-alkanesulfonate. The control dry repair product was prepared by mixing together the following components:

Calcium sulfate (e.g., White Moulding Plaster available from USG Corporation of Chicago, Ill.), 45%, Calcium carbonate (e.g., GSP-30 available from Imerys Pigments & Additives Group of Rossville, Ga.), 45.9%, Mica, powdered (e.g., Micawhite 200 available from Kings Mountain Mining LLC of Kings Mountain, N.C.), 8%, Vinyl ester polymer (e.g., Vinnapas RP 245 available from Wacker Chemical Corporation of Adman, Mich.), 0.7%, Ethyl hydroxyethyl cellulose (e.g., Bermocoll E-481 FQ available from Azko Nobel Cellulosic Specialties of Dobbs Ferry, N.Y.), 0.3%, Sodium citrate (available from Ashland Chemical Company of Columbus, Ohio), 0.05%.

The above percent by weights for each component in the sample and the control are based on the dry repair product, i.e., before the addition of water, for example. The dry repair product sample and the control repair product were mixed 1 part water to 3 parts powder, then the mixtures were applied to vertical drywall boards, per techniques standard in the art. The repair products were left to dry for 3 days until thoroughly dried. The dried repair products then were sanded.

The volume of dust that accumulated in a 1 foot square area immediately beneath the vertically sanded repair products was compared. As determined by visual observation, the amount of airborne dust, including persistent airborne dust particulates, of the test sample repair product was greatly diminished when compared to the control.

EXAMPLE 2

A wet repair product, such as for use as a joint or spackling compound for patching surfaces, was prepared by mixing together the following components:

Calcium carbonate (e.g., Marble Dust available from Imerys Pigments & Additives Group of Roswell, Ga.), 41.6%, Calcium carbonate (e.g., Microwhite 100 available from Imerys Pigments & Additives Group of Roswell, Ga.) 27.1%, Aluminum silicate, hydrous (e.g., Attagel 25 available from BASF Corporation of Florham Park, N.J.), 1.9%, Vinyl acetate polymer (e.g., UCAR Latex 353 available from Arkema Inc. of King of Prussia, Pa.), 1.9%, Coco bis(2-hydroxyethyl)amine (e.g, Armostat 400), 1%, Mica, powdered (e.g., Micawhite 200 available from Kings Mountain Mining LLC of Kings Mountain, N.C.), 0.9%, Ethylene Glycol, 0.34%, 2-hydroxyethyl cellulose (e.g., Nexton IP5A available from Ashland Chemical Company of Columbus, Ohio), 0.34%, Mineral Spirits, 0.27%, 2-amino-2-methyl-1-propanol+5% water (e.g., AMP 95 available from Angus Chemical Company a division of The Dow Chemical Company of Buffalo Grove, Ill.), 0.05%, 4,4 Dimethyl Oxazolidine (e.g., Mergal 192 available from Troy Chemical Corporation of Newark, N.J.), 0.04%, Defoamer (e.g., Foamaster NXZ available from Cognis Corporation of Cincinnati, Ohio), 0.04%, Water, 24.4%.

The wet repair product sample was tested against a control, which excluded the antistatic additive coco bis(2-hydroxyethyl)amine. The control wet repair product was prepared by mixing together the following components:

Calcium carbonate (e.g., Marble Dust available from Imerys Pigments & Additives Group of Roswell, Ga.), 42.6%, Calcium carbonate (e.g., Microwhite 100 available from Imerys Pigments & Additives Group of Roswell, Ga.) 27.1%, Aluminum silicate, hydrous (e.g., Attagel 25 available from BASF Corporation of Florham Park, N.J.), 1.9%, Vinyl acetate polymer (e.g., UCAR Latex 353 available from Arkema Inc. of King of Prussia, Pa.), 1.9%, Mica, powdered (e.g., Micawhite 200 available from Kings Mountain Mining LLC of Kings Mountain, N.C.), 0.9%, Ethylene Glycol, 0.34%, 2-hydroxyethyl cellulose (e.g., Nexton IP5A available from Ashland Chemical Company of Columbus, Ohio), 0.34%, Mineral Spirits, 0.27%, 2-amino-2-methyl-1-propanol+5% water (e.g., AMP 95 available from Angus Chemical Company a division of The Dow Chemical Company of Buffalo Grove, Ill.), 0.05%, 4,4 Dimethyl Oxazolidine (e.g., Mergal 192 available from Troy Chemical Corporation of Newark, N.J.), 0.04%, Defoamer (e.g., Foamaster NXZ available from Cognis Corporation of Cincinnati, Ohio), 0.04%, Water, 24.4%.

The ready to use repair products were applied to vertical drywall boards, per techniques standard in the art. The repair products were left to dry for 7 days until thoroughly dried. The dried repair products then were sanded.

With respect to the test and control repair products of Example 2, each test specimen was sanded with 120 grit mesh sanding screen mounted over a ¾" thick 3M ScotchBrite padding, attached to a Makita model BO4556 electric finishing sander operating at 14,000 orbits per minute. Sanding of each test specimen was performed making upward and downward motions using ordinary pressure and continued until the sample thickness was removed without disturbing the drywall backing panel. The sander was oriented with its exhaust port to the left horizontal and no dust bag was attached.

The quantity of airborne dust particulates was measured using a TSI DustTrack model 8520 aerosol monitor using a (≤) 10 micron impactor. The monitor sampling port was oriented 48" above the center of the test specimen through the center/left side of the test chamber.

For each individual test specimen, the dust monitor was activated to begin the air quality recording and a timer was started to measure the time needed to sand the specimen down to the drywall. When the specimen was completely sanded, the timer was stopped but the monitoring continued until a peak level of airborne dust was achieved, then carried out until the air saturation dropped below 50% of the measured peak level. Before each new specimen was evaluated, the test chamber, finishing sander, and dust monitor were disassembled and cleaned until a quantity of airborne dust below 0.5 mg/m$^3$ was achieved.

As determined by visual observation and by measurements using the aerosol monitor, the amount of airborne dust, including persistent airborne dust particulates, of the test sample repair product was greatly diminished when compared to the control.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, although not discussed at length herein, it is appreciated that wet and dry repair products may be provided without any antistatic additive but include at least one or more metal complexes, particularly heavy metal complexes such as barium or strontium. To that end, the invention in its broader aspects is therefore not limited to the specific details, representative product and method and illustrative examples shown and described. Accordingly, departures may be made from such details without departing from the scope of the general inventive concept.

What is claimed is:

1. A repair product comprising:
   an antistatic additive having a cationic charge, being cationic in nature, or having the ability to form a positive charge and including at least one of a bis amine or an alkali metal salt, and
   a binder and/or filler, wherein the repair product defines a powdered spackling compound or joint compound or further includes water and defines a ready to use spackling compound or joint compound.

2. The repair product of claim 1 wherein the repair product defines the ready to use spackling compound or joint compound.

3. The repair product of claim 1 wherein the antistatic additive is present in an amount from about 0.05% to about 35% by weight of the repair product.

4. The repair product of claim 1 wherein the repair product defines the powdered spackling compound or joint compound.

5. The repair product of claim 1 further comprising a metal complex.

6. The repair product of claim 5 wherein the repair product defines the ready to use spackling compound or joint compound.

7. The repair product of claim 5 wherein the metal complex defines a metal oxide, metal hydroxide, metal carbonate, or metal sulfate and the metal is an alkaline earth metal.

8. The repair product of claim 5 wherein the repair product defines the powdered spackling compound or joint compound.

9. A repair product comprising:
   an antistatic additive selected from a quaternary ammonium compound, an amine compound, an amide, a phosphate, a sulfur compound, a boron containing compound, an aluminum oxide, a metal salt, an ethylene acetate copolymer, a phosphate ester, glyceryl monostearate, mono or diglycerides, or combinations thereof, and being present in an amount from about 0.05% to about 35% by weight of the repair product, and
   a binder and/or filler, wherein the repair product defines a powdered spackling compound or joint compound or further includes water and defines a ready to use spackling compound or joint compound.

10. The repair product of claim 9 wherein the repair product defines the ready to use spackling compound or joint compound.

11. The repair product of claim 9 further including a metal complex.

12. The repair product of claim 11 wherein the repair product defines the ready to use spackling compound or joint compound.

13. The repair product of claim 12 wherein the metal complex is present in an amount from about 0.1% to about 95% by weight of the repair product.

14. The repair product of claim 11 wherein the metal complex defines a metal oxide, metal hydroxide, metal carbonate, or metal sulfate and the metal is an alkaline earth metal.

15. The repair product of claim 11 wherein the antistatic additive is a bis amine, an alkali metal salt, or a quaternary ammonium compound.

16. The repair product of claim 9 wherein the repair product defines the powdered spackling compound or joint compound.

17. The repair product of claim 9 wherein the antistatic additive is a bis amine, an alkali metal salt, or a quaternary ammonium compound.

18. The repair product of claim 9 wherein the antistatic additive is a secondary alkane sulfonate alkali metal salt or a long chain alkyl bis2-hydroxyalkyl) amine.

19. The repair product of claim 18 wherein the antistatic additive is present in an amount from about 0.05% to about 5.0% by wt of the repair product.

20. The repair product of claim 18 further including a metal complex.

21. The repair product of claim 20 wherein the metal complex defines a metal oxide, metal hydroxide, metal carbonate, or metal sulfate and the metal is an alkaline earth metal.

22. The repair product of claim 20 wherein the metal complex is barium sulfate and the antistatic additive is sodium sec alkane sulfonate or coco bis(2-hydroxyethyl) amine.

23. A repair product comprising:
an anti-static additive that is a secondary alkane sulfonate alkali metal salt or a long chain alkyl bis(2-hydroxyalkyl) amine;
a metal complex selected from a metal oxide, metal hydroxide, metal carbonate, or metal sulfate and wherein the metal is an alkaline earth metal; and
a binder and/or filler, wherein the repair product defines a powdered spackling compound or joint compound or further includes water and defines a ready to use spackling compound or joint compound.

24. The repair product of claim 1 wherein the antistatic additive is the alkali metal salt.

25. The repair product of claim 1 wherein the antistatic additive is the bis amine.

26. The repair product of claim 9 wherein the antistatic additive is selected from the bis amine.

27. The repair product of claim 23 wherein the anti-static additive is the long chain alkyl bis(2-hydroxyalkyl) amine.

28. The repair product of claim 23 wherein the repair product defines the powdered spackling compound or joint compound.

* * * * *